(12) United States Patent
Bardman et al.

(10) Patent No.: US 11,155,722 B2
(45) Date of Patent: *Oct. 26, 2021

(54) PREPARATION OF A COATINGS FORMULATION WITH ALKALI SWELLABLE POLYMER PARTICLES

(71) Applicants: Dow Global Technologies LLC, Midland, MI (US); Rohm and Haas Company, Collegeville, PA (US)

(72) Inventors: James K. Bardman, Green Lane, PA (US); Jonathan DeRocher, Coopersburg, PA (US); Andrew Hejl, Landsdale, PA (US); Antony K. Van Dyk, Blue Bell, PA (US); Lin Wang, Furlong, PA (US); Kimy Yeung, Phoenixville, PA (US)

(73) Assignees: Rohm and Haas Company, Collegeville, PA (US); Dow Global Technologies, LLC., Midland (ML)

( * ) Notice: Subject to any disclaimer, the term of this patent is extended or adjusted under 35 U.S.C. 154(b) by 156 days.

This patent is subject to a terminal disclaimer.

(21) Appl. No.: 16/607,257

(22) PCT Filed: May 2, 2018

(86) PCT No.: PCT/US2018/030582
§ 371 (c)(1),
(2) Date: Oct. 22, 2019

(87) PCT Pub. No.: WO2018/204450
PCT Pub. Date: Nov. 8, 2018

(65) Prior Publication Data
US 2020/0299527 A1 Sep. 24, 2020

Related U.S. Application Data

(60) Provisional application No. 62/501,159, filed on May 4, 2017.

(51) Int. Cl.
| | | |
|---|---|---|
| C09D 7/65 | (2018.01) |
| C09D 7/40 | (2018.01) |
| C09D 133/06 | (2006.01) |
| C08F 265/02 | (2006.01) |
| C08F 265/06 | (2006.01) |
| C09D 133/10 | (2006.01) |
| C09D 133/12 | (2006.01) |
| C08F 2/26 | (2006.01) |
| C08F 220/18 | (2006.01) |
| C08F 2/22 | (2006.01) |
| C08F 212/08 | (2006.01) |
| C08F 220/06 | (2006.01) |
| C08F 220/14 | (2006.01) |
| C08K 3/22 | (2006.01) |
| C08L 25/14 | (2006.01) |

(52) U.S. Cl.
CPC .......... *C09D 7/70* (2018.01); *C08F 2/22* (2013.01); *C08F 2/26* (2013.01); *C08F 212/08* (2013.01); *C08F 220/06* (2013.01); *C08F 220/14* (2013.01); *C08F 220/1804* (2020.02); *C08F 265/02* (2013.01); *C08F 265/06* (2013.01); *C08K 3/22* (2013.01); *C08L 25/14* (2013.01); *C09D 7/65* (2018.01); *C09D 7/68* (2018.01); *C09D 133/06* (2013.01); *C09D 133/10* (2013.01); *C09D 133/12* (2013.01); C08K 2003/2203 (2013.01); C08L 2201/50 (2013.01); C08L 2201/52 (2013.01); C08L 2207/53 (2013.01)

(58) Field of Classification Search
CPC ...... C09D 7/70; C09D 133/10; C09D 133/12; C09D 7/65; C09D 7/68; C09D 133/06; C08F 220/1804; C08F 2/22; C08F 212/08; C08F 220/06; C08F 220/14; C08F 265/02; C08F 265/06; C08F 2/26; C08K 3/22; C08K 2003/2203; C08L 25/14; C08L 2205/52; C08L 2207/53
USPC ........................................................ 523/201
See application file for complete search history.

(56) References Cited

U.S. PATENT DOCUMENTS

| | | | |
|---|---|---|---|
| 4,427,836 A | 1/1984 | Kowalski et al. | |
| 4,468,498 A | 8/1984 | Kowalski et al. | |
| 5,021,469 A * | 6/1991 | Langerbeins | ......... C08F 285/00 523/201 |
| 5,266,646 A * | 11/1993 | Eisenhart | ............. A61K 8/8152 525/301 |
| 5,326,843 A | 7/1994 | Lorah et al. | |
| 5,545,695 A | 8/1996 | Blankenship | |
| 9,340,685 B2 | 5/2016 | Carchidi et al. | |
| 2008/0058473 A1* | 3/2008 | Freidzon | ............... C08L 51/003 525/191 |

(Continued)

FOREIGN PATENT DOCUMENTS

| | | |
|---|---|---|
| EP | 0842992 | 5/1998 |
| EP | 0842992 A2 | 5/1998 |

(Continued)

*Primary Examiner* — Hannah J Pak
(74) *Attorney, Agent, or Firm* — Reid S. Willis

(57) ABSTRACT

The present invention relates to a process for preparing a coatings composition with an open time additive comprising the steps of a) contacting an aqueous dispersion of alkali swellable polymer particles with a rheology modifier and a binder to form a coatings composition with a VOC of less than 50 g/L; and b) neutralizing the alkali swellable particles with a non-volatile base after or upon contact with the rheology modifier and the binder to form swelled multi-staged polymer particles; wherein the alkali swellable polymer particles comprise a shell having a $T_g$ of not greater than 25° C. and an acid functionalized core; and wherein the core-to-shell ratio is in the range of from 1:3.2 to 1:10. The composition arising from the process of the present invention is useful for improving open time, especially for low VOC coatings applications.

9 Claims, No Drawings

(56) References Cited

U.S. PATENT DOCUMENTS

2013/0066005 A1    3/2013   Luckenbach et al.
2021/0108089 A1*   4/2021   Bardman ........... C09D 151/003

FOREIGN PATENT DOCUMENTS

WO    2008028062      3/2008
WO    2008028062 A2   3/2008

* cited by examiner

PREPARATION OF A COATINGS FORMULATION WITH ALKALI SWELLABLE POLYMER PARTICLES

BACKGROUND OF THE INVENTION

The present invention relates to a process for preparing a coatings formulation with an aqueous dispersion of alkali swellable polymer particles. The dispersion of alkali swellable polymer particles is useful as an open time additive in coatings formulations.

Government regulations and market movement continually drive toward zero volatile organic compounds (VOC) for coating formulations. Consequently, waterborne formulations that are free of volatile solvents and coalescents have become increasingly popular in the industry. Nevertheless, paint properties have been compromised due to this sea change; among them is open time, which is the period of time during which a freshly applied paint film can be reworked without leaving brush marks. In a solvent-borne system, open time is about 30 to 45 min; in a typical waterborne formulation, open time is on the order of 3 to 5 min. Accordingly, there is a need in the art to find an additive for waterborne formulations that increases open time over currently available additives without degrading other properties of the final coating, such as film adhesive and cohesive strength, hardness, block resistance, early blister resistance, scrub and wash resistance, stain resistance, and mar resistance.

SUMMARY OF THE INVENTION

The present invention addresses a need in the art by providing a process for preparing a coatings composition with an open time additive comprising the steps of a) contacting an aqueous dispersion of alkali swellable polymer particles with a rheology modifier and a binder to form a coatings composition with a VOC of less than 50 g/L; and b) neutralizing the alkali swellable particles with a non-volatile base after or upon contact with the rheology modifier and the binder to form swelled multi-staged polymer particles; wherein the alkali swellable polymer particles comprise a shell having a $T_g$ of not greater than 25° C. and an acid functionalized core; and wherein the core-to-shell ratio is in the range of from 1:3.2 to 1:10.

In another aspect, the present invention provides a process for preparing a coatings composition with an open time additive comprising the step of contacting an open time additive which is an aqueous dispersion of alkali swellable polymer particles with a rheology modifier and a binder to form a coatings composition with a VOC of less than 50 g/L; wherein the alkali swellable particles are neutralized with a base after or upon contact with the rheology modifier and the binder to form swelled multi-stage polymer particles; wherein the alkali swellable polymer particles comprise a shell having a $T_g$ of not greater than 25° C. and an acid functionalized core; and wherein the core-to-shell ratio is in the range of 1:3.2 to 1:6, and wherein the coating composition with the open time additive exhibits less than a 50% increase in viscosity than the coating composition without the open time additive.

The coatings composition arising from the process of the present invention has a significantly higher open time than comparable formulations that do not contain the swelled multi-stage polymer particles.

DETAILED DESCRIPTION OF THE INVENTION

In a first aspect, the present invention is a process for preparing a coatings composition with an open time additive comprising the steps of a) contacting an aqueous dispersion of alkali swellable polymer particles with a rheology modifier and a binder to form a coatings composition with a VOC of less than 50 g/L; and b) neutralizing the alkali swellable particles with a non-volatile base after or upon contact with the rheology modifier and the binder to form swelled multi-staged polymer particles; wherein the alkali swellable polymer particles comprise a shell having a $T_g$ of not greater than 25° C. and an acid functionalized core; and wherein the core-to-shell ratio is in the range of from 1:3.2 to 1:10.

The alkali swellable polymer particles are characterized by an acid functionalized $1^{st}$ stage portion (the core), preferably a carboxylic acid functionalized core, and a second stage portion (the shell) having a $T_g$ as calculated by the Fox equation of not greater than 25° C. The words "core" and "shell" are used herein as a convenience to describe the first and final stages of the polymerization process (or first and second stages if the polymer particles are generated in two stages). Accordingly, the final alkali swellable polymer particles may, but need not have a core-shell morphology. The alkali swellable polymer particles may be prepared by any of a number of techniques, including those well known in the art. (See U.S. Pat. Nos. 4,468,498; 5,326,843; and 9,340,685). For example, the core may be produced by a single stage or a multistage process, optionally in the presence of a chain transfer agent such as n-dodecyl mercaptan or mercaptoethanol. The core may also be prepared from a seed process. The core is then used in making the alkali swellable polymer particles in one or more additional stages. Preferably, the core-to-shell ratio is in the range of from 1:3.2 to 1:6.

Preferably, the core comprises from 30, more preferably from 35, and most preferably from 38 weight percent, to preferably 50, more preferably to 45, and most preferably to 42 weight percent structural units of a carboxylic acid monomer, based on the weight of the core. As used herein, the term "structural units" refers to the remnant of the recited monomer after polymerization. For example, a structural unit of methacrylic acid is as illustrated:

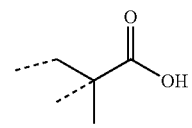

structural unit of methacrylic acid

The acid functionalized core also preferably comprises from 50, more preferably from 55, and most preferably from 58 weight percent, to preferably 70, more preferably to 65, and most preferably to 62 weight percent structural units of a nonionic ethylenically unsaturated monomer.

Examples of carboxylic acid functionalized monomers include methacrylic acid, acrylic acid, and itaconic acid, with acrylic acid and methacrylic acid being preferred. Examples of nonionic ethylenically unsaturated monomers include one or more $C_1$-$C_{10}$ alkyl acrylates and methacrylates such as methyl methacrylate, ethyl acrylate, ethyl methacrylate, butyl acrylate, butyl methacrylate, and 2-ethylhexyl acrylate; and styrene. Methyl methacrylate and butyl methacrylate are preferred nonionic ethylenically unsaturated monomers.

The core may also comprise structural units of a polyethylenically unsaturated monomer such as ethylene glycol di(meth)acrylate, allyl (meth)acrylate, 1,3-butane-diol di(meth)acrylate, diethylene glycol di(-meth)acrylate, trimethylol propane trimethacrylate, or divinyl benzene. The structural units of the polyethylenically unsaturated monomer, if present, are preferably in the range of from 0.1, more preferably from 0.3 weight percent to 10, more preferably to 3 weight percent, based on the weight of the core.

Prior to contact with the base, the core preferably has an average diameter in the range of from 100 nm, more preferably from 120 nm, most preferably from 150 nm, to preferably 500 nm, more preferably to 400 nm, more preferably to 350 nm, and most preferably to 250 nm, as measured by a BI-90 Plus Brookhaven Particle Analyzer.

The shell more preferably has a $T_g$ of not greater than 20° C., and most preferably not greater than 15° C. Preferably the shell comprises structural units of one or more monomers having a $T_g$ of >50° C. (that is, one or more high $T_g$ monomers) such as methyl methacrylate ($T_g$=105° C.) or styrene ($T_g$=100° C.) or a combination thereof, and structural units of at least one monomer having a $T_g$ of less than 10° C. (that is, one or more one low $T_g$ monomers) such as ethyl acrylate ($T_g$=−23° C.), butyl acrylate ($T_g$=−53° C.), or 2-ethylhexyl acrylate ($T_g$=−52° C.) or combinations thereof. The shell preferably further comprises structural units of an acid monomer, preferably a carboxylic acid monomer, preferably methacrylic acid ($T_g$=228° C.) or acrylic acid ($T_g$=101° C.). (The recited $T_g$s refer to those of the corresponding homopolymers as reported by Polymer Properties Database © 2015.)

Preferably, the concentration of structural units of the high $T_g$ monomer in the shell, preferably methyl methacrylate or styrene, more preferably methyl methacrylate, is in the range of from 40, more preferably from 42, and most preferably from 44 weight percent, to preferably 60, more preferably to 55, more preferably to 50, and most preferably to 48 weight percent, based on the weight of the shell.

Preferably the concentration of structural units of the low $T_g$ monomer in the shell is in the range of from 38, more preferably from 45, more preferably from 48 weight percent, and most preferably from 50 weight percent, to preferably 59, more preferably to 57, and most preferably to 54 weight percent, based on the weight of the shell. The low $T_g$ monomer is preferably butyl acrylate.

Preferably, the concentration of structural units of the carboxylic acid monomer in the shell is in the range of from 0.2, more preferably from 0.5 weight percent, to preferably 5, more preferably to 3, and most preferably to 2 weight percent, based on the weight of the shell.

Preferably, the average diameter of the alkali swellable polymer particles is in the range of from 150 nm, more preferably from 200 nm, to 900 nm, more preferably to 750 nm, more preferably to 550 nm, more preferably to 400 nm, and most preferably to 300 nm, as measured by a BI-90 Plus Brookhaven Particle Analyzer.

Preferably, the concentration of the alkali swellable polymer particles prior to contact with the binder and the rheology modifier is in the range of from 10, more preferably from 20, and most preferably from 30 weight percent, to 60, more preferably to 50 weight percent based on the weight of water and the alkali swellable polymer particles.

Once the alkali swellable polymer particles are contacted with binder and the rheology modifier, preferably contacted with a coatings composition comprising the binder and the rheology modifier, the alkali swellable polymer particles can be neutralized to form neutralized multi-stage polymer particles without any further addition of non-volatile base (because the composition contains a sufficient amount of a base to neutralize and swell the core of polymer particles); it is often preferred, however, to post-add add a non-volatile base to the coatings composition to ensure that the pH is in the desired range of the formulation.

As used herein, a non-volatile base refers to a base having a boiling point of greater than 150° C. As used herein, "neutralize" means that the pH of the core is raised to a pH that is at least 1.5 units higher than the $pK_a$ of the acid monomer used to make the acid functionalized core. For example, if methacrylic acid ($pK_a$=4.65) is used to make the acid functionalized core, the pH of the coatings composition is, or is adjusted to, at least 6.15, preferably at least 6.5, more preferably at least 7, and most preferably at least 8. Preferably the amount of non-volatile base added, or already present in the coatings formulation, is at least 50% stoichiometric, more preferably, at least stoichiometric, and most preferably greater than stoichiometric with respect to the acid content of alkali swellable polymer particles.

The non-volatile base increases the pH of the core, thereby neutralizing and swelling it. Examples of suitable non-volatile bases for this aspect of the invention include 2-amino-2-methyl-1-propanol (commercially available as AMP 95 neutralizing agent), n-butyldiethanolamine (commercially available as Vantex T neutralizing agent), LiOH, NaOH, or KOH. Where low VOC formulations are desired, the alkali metal hydroxides LiOH, NaOH, or KOH, are especially preferred. Preferably, the base is contacted with the alkali swellable polymer particles at a temperature in the range of from 15° C., more preferably from 20° C., to 50° C., more preferably to 40° C., and most preferably to 30° C.

As used herein, the term binder refers to an aqueous dispersion of polymer particles that exhibit less than a 10-nm increase in particle size when exposed to base. These polymer particles (binder solids) preferably have an average diameter in the range of from 70 nm, more preferably from 100 nm to 600 nm, more preferably to 500 nm as determined by a Brookhaven BI-90 Plus Particle Size Analyzer. The binder solids comprise less than 5 weight percent, preferably less than 4 weight percent, and most preferably less than 3 weight percent structural units of an acid monomer, based on the weight of the binder solids.

The binder is advantageously prepared by aqueous emulsion polymerization of one or more ethylenically unsaturated monomers, examples of which include styrene, vinyl acetate, acrylamide, methacrylamide, acrylonitrile, and $C_1$-$C_{10}$-alkyl esters of acrylic acid or methacrylic acid including methyl methacrylate, ethyl methacrylate, ethyl acrylate, butyl acrylate, 2-propylheptyl acrylate, and 2-ethylhexyl acrylate.

As used herein, the term rheology modifier refers to water soluble or water dispersible associative rheology modifiers such as hydrophobically modified ethylene oxide urethane polymers (HEURs), hydrophobically modified alkali swellable emulsions (HASEs), and styrene-maleic anhydride terpolymers (SMATs), as well as non-associative rheology modifiers such as alkali swellable emulsions (ASEs) and hydroxyethyl cellulose (HEC) thickeners.

The concentration of polymer particles associated with the binder (binder solids) in the coatings formulation is preferably in the range of from 3, more preferably from 5, and most preferably from 10, to preferably 50, more preferably to 40, and most preferably to 30 weight percent, based on the weight of solids in the coatings composition. The concentration of the rheology modifier is in the range of from 0.5 to 5 weight percent, based on the weight of solids in the coatings composition.

The concentration of neutralized multi-stage polymer particles in the coatings composition is preferably in the range of from 0.1, preferably from 0.2, and more preferably from 0.5 weight percent, to 10, preferably to 5, more preferably to 4, and most preferably to 3 weight percent, based on the weight of the coatings composition. Although neutralization of the core will tend to increase the viscosity of the coatings composition (See U.S. Pat. No. 4,468,498), the viscosity change after neutralization using the process of the present invention is less than 50%, preferably less than 40%, and most preferably less than 30% compared to the viscosity of the coatings composition before neutralization. Preferably, the increase in viscosity after neutralization is less than 30 KU, more preferably less than 20 KU, and most preferably less than 15 KU.

Thickening, if it does occur, occurs relatively rapidly. Preferably, at least 90%, more preferably at least 95%, and most preferably at least 99% of the final viscosity of the coatings composition is attained in less than 1 hour beyond completion of base addition.

Accordingly, in a second aspect, the present invention provides a process for preparing a coatings composition with an open time additive comprising the steps of a) contacting an open time additive which is an aqueous dispersion of alkali swellable polymer particles with a rheology modifier and a binder to form a coatings composition with a VOC of less than 50 g/L; wherein the alkali swellable particles are neutralized with a base after or upon contact with the rheology modifier and the binder to form swelled multi-staged polymer particles; wherein the alkali swellable polymer particles comprise a shell having a $T_g$ of not greater than 25° C. and an acid functionalized core; wherein the core-to-shell ratio is in the range of 1:3.2 to 1:6, and wherein the coating composition with the open time additive exhibits less than a 50% increase in viscosity than the coating composition without the open time additive. In this aspect of the invention, volatile bases such as ammonia, trimethylamine, triethylamine, or methylisopropylamine can also be used; however, non-volatile bases, especially the alkali metal hydroxides, are preferred where low VOC formulations are desired.

The dispersion of alkali swellable polymer particles of the present invention, while suitable as an open time additive for coatings compositions, is not suitable as a thickener; the concentration of the alkali swellable polymer particles is purposefully maintained at a level that does not produce appreciable thickening of the composition.

The aqueous dispersion of alkali swellable polymer particles, the binder, and the rheology modifier may be combined in any order. Preferably, the alkali swellable polymer particles are contacted with an aqueous dispersion of binder and rheology modifier, followed by addition of base. The composition prepared by the process of the present invention may further advantageously include any or all of the following components: dispersants, pigments, defoamers, surfactants, solvents, extenders, coalescents, biocides, opaque polymers, and colorants. The composition is a low volatile organic content (VOC) composition having less than 50 g/L of VOCs.

EXAMPLES

Intermediate Example—Preparation of an Alkali Swellable Polymer Having a 1:5 Core-to-Shell Ratio A. Preparation of 1$^{st}$ Stage (Core)

A first stage (core, 60 MMA/40 MAA) was prepared as follows: A 5-L, four-necked round bottom flask (kettle) was equipped with a paddle stirrer, thermometer, N$_2$ inlet, and reflux condenser. Deionized water (1760 g), was added to the kettle and heated to 86° C. under N$_2$. A monomer emulsion (ME1) was prepared by mixing deionized water (720 g), sodium dodecyl benzene sulfonate (SDS, 5.2 g, 23% active), methyl methacrylate (780.0 g), and methacrylic acid (10.0 g). A portion of ME1 (164.0 g) was removed and placed aside in a separate container. To the remaining ME1 was added SDS (50.0 g, 23% active) and methacrylic acid (510.0 g). When the kettle temperature reached 86° C. a mixture of deionized water (160.0 g) and SDS (5.0 g, 23% active) was added to the kettle, followed by the addition of the ME1 initially removed and set aside. A mixture of sodium persulfate (5.5 g) in deionized water (40.0 g) was then added to the kettle. The temperature of the kettle dropped to −76° C., then was allowed to rise to 85° C. during a 15-min hold period. The remaining ME1 was then fed to the kettle over 2 h at 85° C. After completion of the ME1 feed, the dispersion was held at 85° C. for 15 min, whereupon the dispersion was cooled to 25° C. and filtered to remove any coagulum. The filtered dispersion had a pH of 2.9, a solids content of 31.7% and an average particle size of 152 nm.

B. Preparation of a Dispersion of Alkali Swellable Polymer Particles with a 1:5 Core-to-Shell Ratio and 40% Methacrylic Acid in the Core To a 5-L, four-necked round bottom flask (kettle) was equipped with a paddle stirrer, thermometer, N$_2$ inlet, and reflux condenser was added DI water (500 g) and heated to 86° C. under N$_2$. A monomer emulsion (ME2) was prepared by mixing DI water 193 g, SDS (14.3 g, 23% active), butyl acrylate (655.2 g), methyl methacrylate (585.9 g), and methacrylic acid (18.9 g). When the kettle temperature reached 86° C., the dispersion of part A (795.0 g) was added to the kettle and the temperature adjusted to 60° C. A 0.1% solution of iron (II) sulfate in water (20 g) was then added to the kettle along with a solution of isoascorbic acid (0.6 g) mixed with DI water (45 g). Co-feed solutions of sodium persulfate (3.8 g) in DI water (90 g) and sodium bisulfite (2.5 g) in DI water (90 g) were added at a rate of 0.7 g/min to the kettle. Three minutes after the initiation of co-feed solution addition, the ME2 was added at a rate of 2 g/min. Ten minutes after initiation of the ME2 addition, the feed rate was increased to 4 g/m. After another ten minutes, the ME2 feed rate was increased to 8 g/min. After another ten minutes, the ME feed rate was increased to 16 g/min. The temperature of the kettle was kept at 59-61° C. throughout the addition of ME2. After completion of the addition of ME2, the co-feeds were overfed for another twenty minutes. After the completion of co-feed addition, the contents of the kettle was cooled to room temperature and filtered to remove any coagulum. The filtered dispersion had a pH of 2.1, a solids content of 47.5% and an average particle size of 275 nm as measured by a BI-90 Plus Brookhaven Particle Analyzer.

Comparative Intermediate Example—Preparation of an Alkali Swellable Polymer Having a 1:10 Core-to-Shell Ratio The alkali swellable polymer was prepared substantially as described in the Intermediate Example except that the core-to-shell weight-to-weight ratio was 1:10.

Paint formulation were prepared by adding the dispersion of alkali swellable polymer particles (ASP) to a formulation described in Table 1.

TABLE 1

Paint Formulation with Open Time Additive

| Material Name | Pounds | Gallons |
|---|---|---|
| RHOPLEX ™ HG-706 Binder | 525.7 | 59.37 |
| BYK-024 Defoamer | 1.0 | 0.1 |
| Propylene Glycol | 4.3 | 0.5 |
| TRITON ™ X-100 Surfactant | 4.4 | 0.5 |
| Water | 16.7 | 2.0 |
| KATHON ™ LX 1.5% Biocide | 1.5 | 0.2 |
| TAMOL ™ 2002 Dispersant | 2.0 | 0.2 |
| Ammonia (28%) | 1.0 | 0.1 |
| Ti-Pure R-746 TiO$_2$ | 285.0 | 14.7 |
| Water | 20.0 | 2.4 |
| TEXANOL Coalescent | 7.9 | 1.0 |
| ACRYSOL ™ RM-2020E Rheology Modifier | 20.0 | 2.3 |
| ACRYSOL ™ RM-725 Rheology Modifier | 3.0 | 0.4 |
| BYK-024 Defoamer | 2.0 | 0.2 |
| ASP (25% solids) | 95.5 | 11.4 |
| Water | 38.7 | 4.63 |
| Totals | 1030 | 100 |

RHOPLEX, TRITON, KATHON, TAMOL, and ACRYSOL are all Trademarks of The Dow Chemical Company or its Affiliates.

The pHs of three separate paint formulations were adjusted with three different bases: NH$_4$, 2-amino-2-methyl-1-propanol and NaOH by adding a sufficient amount of each base to achieve a pH of >7.

Open time was measured in accordance with ASTM-D7488. The test was performed in a constant temperature/humidity room (72° F., 50% RH). Paint was deposited on a black vinyl scrub chart using a drawdown bar with a 5-mil gap. The film was immediately scored by making parallel marks in the wet paint using two wooden applicators. Sections of the film were then brushed at timed intervals using a primed 1" nylon brush. The film was allowed to dry overnight. A panel of at least three readers visually inspected the panel and recorded the last cross brush section that showed no sign of the score marks as the open time. The measured open time for the alkali swellable polymer samples with a core-to-shell ratio of 1:5 and neutralized by NH$_4$OH, NaOH, and 2-amino-2-methyl-1-propanol was 12 min for each coating, as compared to 6 min for a coating prepared from the identical paint formulation but without the open time additive, and 10 min for the coating prepared using the alkali swellable polymer particles with a core-to-shell ratio of 1:10. It was also observed that the formulation exhibited an increase of viscosity of only 30%, demonstrating that the alkali swellable polymer particles were ineffective as a thickener at the concentrations used.

The invention claimed is:

1. A process for preparing a coatings composition with an open time additive comprising the steps of a) contacting an aqueous dispersion of alkali swellable polymer particles with a rheology modifier and a binder to form a coatings composition with a VOC of less than 50 g/L; and b) neutralizing the alkali swellable polymer particles with a non-volatile base after or upon contact with the rheology modifier and the binder to form swelled multi-staged polymer particles; wherein the alkali swellable polymer particles comprise a shell having a T$_g$ of not greater than 25° C. and an acid functionalized core; and wherein the core-to-shell ratio is in the range of from 1:3.2 to 1:10.

2. The process of claim 1 wherein the aqueous dispersion of alkali swellable polymer particles has a solids content in the range of from 10 to 60 weight percent, based on the weight of the aqueous dispersion of alkali swellable polymer particles.

3. The process of claim 2 wherein the acid functionalized core of the alkali swellable polymer particles comprises from 30 to 50 weight percent structural units of a carboxylic acid monomer, and from 50 to 70 weight percent structural units of a nonionic ethylenically unsaturated monomer, based on the weight of the core; and wherein the shell of the alkali swellable polymer particles has a T$_g$ of not greater than 20° C. and comprises structural units of a monomer having a T$_g$ of greater than 50° C., structural units of a monomer having a T$_g$ of less than 10° C., and structural units of an acid monomer.

4. The process of claim 3 wherein the acid functionalized core of the alkali swellable polymer particles comprises from 35 to 45 weight percent structural units of methacrylic acid or acrylic acid, based on the weight of the core; and from 55 to 65 weight percent structural units of a nonionic ethylenically unsaturated monomer, wherein the nonionic ethylenically unsaturated monomer is methyl methacrylate or butyl methacrylate; wherein the shell comprises from 40 to 60 weight percent structural units of styrene or methyl methacrylate, from 38 to 59 weight percent structural units of butyl acrylate, and from 0.2 to 5 weight percent structural units of methacrylic acid or acrylic acid; and wherein the average diameter o f the alkali swellable polymer particles is in the range of from 150 nm to 900 nm.

5. The process of claim 3 wherein the base, which is LiOH, NaOH, or KOH, is added to the coatings composition at a temperature in the range of from 15° C. to 50° C. after the alkali swellable polymer particles are contacted with the rheology modifier and the binder; and wherein the average diameter of the alkali swellable polymer particles is in the range of from 150 nm to 300 nm.

6. The process of claim 3 wherein the base, which is LiOH, NaOH, or KOH, is added to the composition at a temperature in the range of from 15° C. to 50° C. before the alkali swellable particles are contacted with the rheology modifier and the binder; and wherein the average diameter of the alkali swellable polymer particles is in the range of from 150 nm to 300 nm.

7. The process of claim 5 wherein the concentration of neutralized multi-stage polymer particles is in the range of from 0.1 to 5 weight percent based on the weight of the coatings composition; the concentration of the binder solids is in the range of from 3 to 50 weight percent based on the weight of the coatings composition; and the concentration of the rheology modifier is in the range of from 0.5 to 5 weight percent, based on the weight of the coatings composition.

8. The process of claim 7 wherein the coatings composition further includes at least one component selected from the group consisting of dispersants, pigments, defoamers, surfactants, solvents, extenders, coalescents, biocides, opaque polymers, and colorants.

9. A process for preparing a coatings composition with an open time additive comprising the steps of a) contacting an open time additive which is an aqueous dispersion of alkali swellable polymer particles with a rheology modifier and a binder to form a coatings composition with a VOC of less than 50 g/L; wherein the alkali swellable polymer particles are neutralized with a base after or upon contact with the rheology modifier and the binder to form swelled multi-stage polymer particles; wherein the alkali swellable polymer particles comprise a shell having a $T_g$ of not greater than 25° C. and an acid functionalized core; and wherein the core-to-shell ratio is in the range of 1:3.2 to 1:6, and wherein the coating composition with the open time additive exhibits less than a 50% increase in viscosity than the coating composition without the open time additive.

\* \* \* \* \*